G. B. McCRACKEN.
VALVE.
APPLICATION FILED APR. 28, 1920.
1,389,955.
Patented Sept. 6, 1921.
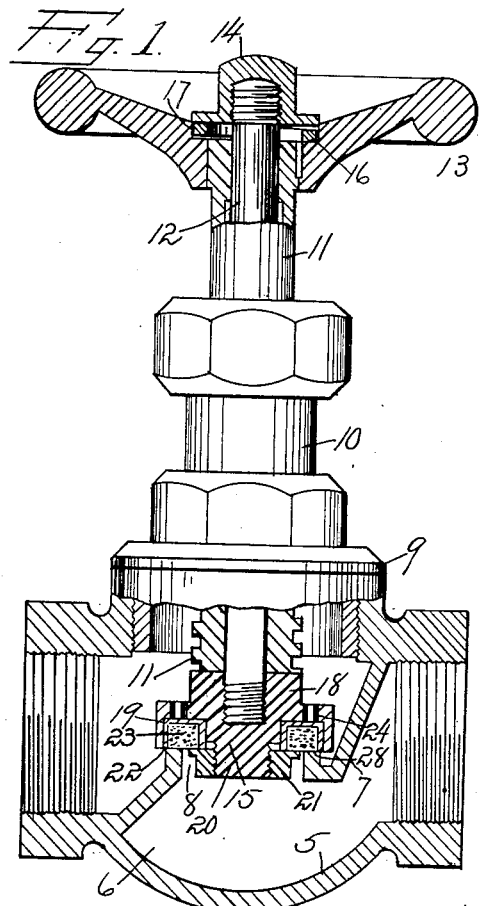
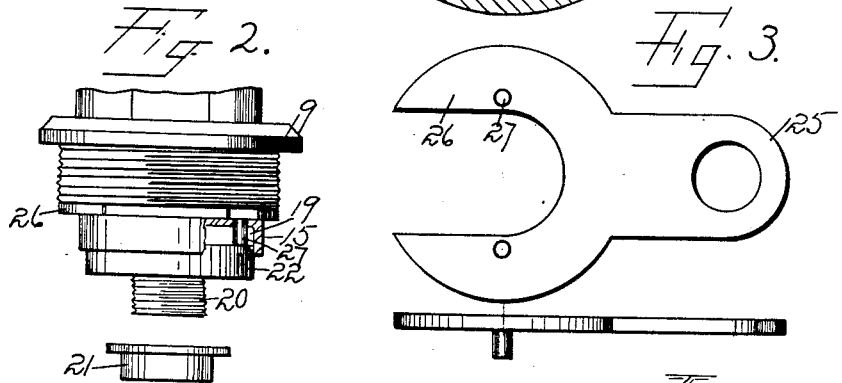
INVENTOR
George B. McCracken,
by
Arthur C. Jenkins,
ATTORNEY

UNITED STATES PATENT OFFICE.

GEORGE B. McCRACKEN, OF WILLIMANTIC, CONNECTICUT.

VALVE.

1,389,955.  Specification of Letters Patent.  Patented Sept. 6, 1921.

Application filed April 28, 1920. Serial No. 377,214.

*To all whom it may concern:*

Be it known that I, GEORGE B. MC-CRACKEN, a citizen of the United States, and a resident of Willimantic, in the county of Windham and State of Connecticut, have invented a new and Improved Valve, of which the following is a specification.

My invention relates to the class of devices for controlling the flow of fluids, and an object of my invention, among others, is to provide a device of this class that shall be particularly efficient to accomplish its desired purpose and one having means whereby valves may be removed for renewal or other purposes with little trouble.

One form of valve embodying my invention and in the construction and use of which the objects herein set out, as well as others, may be attained, is illustrated in the accompanying drawings, in which—

Figure 1 is a view in side elevation of a valve embodying my invention with parts broken away in central section to illustrate the construction.

Fig. 2 is a side view of the cap and valve holder removed from the valve body and with parts broken away to show construction.

Fig. 3 is a face and edge view of a tool for removing the valve, on enlarged scale.

In the accompanying drawings the numeral 5 denotes a valve body having a chamber 6 therein divided by a diaphragm 7 having a passage 8 for flow of fluid. A cap 9 with an integral extension 10 therefrom is secured to one side of the valve body, and a spindle sleeve 11 is screw threaded into this neck for the purpose of operating a valve supported at the lower end of a valve spindle 12 located within the spindle sleeve and rotatable independently thereof. A handle wheel 13 is secured to the sleeve 11, as by means of a key or other suitable device, and a cap nut 14 frictionally connects the spindle 12 and the sleeve so that the latter may be turned independently of the spindle under certain conditions by rotating said wheel. All of the parts thus far mentioned are embodied in my U. S. Patent No. 1,285,286, dated November 19, 1918, and, except in connection with the parts to be hereinafter mentioned, form no part of my present invention.

Valves of the class herein described are frequently employed to control the flow of steam. In operation of the parts to open the valve there is a tendency, as initial force is applied to the wheel 13, to separate to a slight degree the lower end of the sleeve 11 and the back of the valve holder 15, creating a very slight opening but sufficient, when the steam is under considerable pressure, to permit its escape from the chamber within the valve to the space within the lower end of the sleeve from which it will flow along the spindle 12, and between said spindle and the sleeve, and escape underneath the nut 14, with a result that the hand of the operator is liable to be burned by such escaping steam. In the device of my previous patent, hereinabove referred to, a packing is employed within the lower end of the sleeve to prevent this escape of steam.

In the device of this application I have provided other and simpler means for preventing such results by inserting a spring 16 or other equivalent means within a recess 17 in the upper surface of the hand wheel 13, this recess being covered by the cap nut 14. The action of this spring is, by pressure against said wheel, to force the sleeve 11 downwardly and the spindle 12 upwardly, with a result that the lower edge of said sleeve and the back of the valve holder 15 are caused to press one against the other, and sufficiently to prevent any escape of steam at this point, thus doing away with the packing within the lower end of the sleeve and the trouble caused to repack the parts at this point when the packing shall become worn out. The spring 16 also serves another purpose, to wit: that of a lock to prevent loosening of the nut 14.

To embody my invention in its preferred form I construct the valve holder 15 in the form of a recessed block having on one side a hub 18 in which the lower end of the spindle 12 is secured, in any suitable manner, and on the opposite side a valve pocket 19 in the form of an annular recess, said block also having a stud end 20 preferably screw threaded to receive a valve clamping nut 21 for a valve fitted within said pocket. This valve comprises a case 22 and a filling 23, the latter corresponding to the valve proper in ordinary structures.

In devices of this class when it becomes necessary to renew the valve, commonly composed of fibrous material, the structure must be taken apart, the valve spindle removed and the valve dug out from its recess within the holder owing to the fact that under the conditions of use such valve becomes very hard. I have provided my improved valve herein described with means for obviating this defect and in carrying this purpose into effect I make a hole or holes 24 extending through the back of the valve holder or block and I provide a packing removing tool comprising a handle 25 and a forked head including branches 26 with a space between them sufficiently wide to straddle the hub 18. Valve removing pins 27 extending from the branches 26 are positioned to enter the holes in the valve holder.

The case 22 may be made from a thin metal disk formed to shape in any desirable manner, and the construction is such as to enable its production at very little expense, so that when a valve is worn out it may be discarded with but little loss. Moreover the structure is such as to enable the valve to be removed from its pocket with but little trouble, and especially by the use of the tool hereinabove described. This structure has another feature, and this is that in case of emergency by inability to readily obtain another valve, should the filling become worn, the valve may be taken out and reversed so that the metal case 22 will be pressed against the metal valve seat 28. This will provide a valve sufficiently tight to answer the requirements for a short time and until another valve may be obtained.

In use the cap 9 and parts secured thereto are removed from the body 5, said cap always acting as a supporting member, as illustrated in Figs. 1 and 2 of the drawings, and the valve removing tool is placed in position so that the pins 27 will enter the holes 24. The hand wheel 13 may now be employed to move the spindle sleeve 11 upwardly causing the branches 26 of the tool to press against the lower edge of the cap 9. Increased pressure, caused by rotation of the hand wheel 13, will force the pins 27 through the holes 24 and the valve from its pocket within the valve holder or block 14.

It should also be noted that the tool may be employed to prevent turning movement of the valve holder when it is desired to unscrew the spindle 12 or the nut 21 therefrom.

I claim:

1. A valve structure comprising a valve body, a screw threaded sleeve extending into said body, a valve spindle located within said sleeve, a valve holder carried by said spindle, the back of said holder making contact with the end of said sleeve, and a spring positioned to force the end of said sleeve and the back of said holder into close contact.

2. A valve structure comprising a valve body, a screw threaded sleeve extending into said body, a valve spindle located within said sleeve, a valve holder carried by said spindle, the back of said holder making contact with the end of said sleeve, and a spring located at the upper end of said sleeve and arranged to exert force against said sleeve and said spindle in opposite directions to force the lower end of the sleeve and the back of the holder into close contact.

3. A valve structure comprising a valve body, a screw threaded sleeve extending into said body, a valve spindle located within said sleeve, a holder carried by said spindle, the back of said holder making contact with the end of said sleeve, a nut secured to the upper end of said spindle, and a spring located underneath said nut and exerting force against said sleeve to press the end of the sleeve and the back of the holder into close contact.

4. A valve structure comprising a valve body, a screw threaded sleeve extending into said body, a valve spindle located within said sleeve, a valve holder carried by said spindle, the back of said holder making contact with the end of said sleeve, a hand wheel secured to said sleeve and having a recess therein, a nut secured to said spindle, and a spring located in said recess and pressing against said nut thereby forcing the end of said sleeve and the back of said holder into close contact.

5. A valve structure including a supporting member, a valve spindle movably supported by said member, a valve holder carried by said spindle and having a pocket for a valve and an opening into said pocket from the back of the holder for the insertion and free movement of a tool to remove the valve therefrom, and means for operating the spindle to carry said holder toward said supporting member and thereby force said tool against the valve to remove it.

6. A valve structure including a supporting member, a valve spindle movably supported by said member, a valve holder having a hub on one side to receive said spindle and a pocket on its opposite side to receive a valve and with openings on opposite sides of said hub into said pocket for insertion and free movement of a tool to remove the valve from said pocket, and means for operating the spindle to carry said holder toward said supporting member and thereby force said tool against the valve to remove it.

7. A valve structure including a supporting member, a valve spindle movably supported by said member, a valve holder carried by said spindle and having a pocket for a valve and an opening into said pocket from the back of the holder, means for operating the spindle to move the holder toward said supporting member, and a tool adapted to be pressed between said supporting member and said holder to force a pin on the tool through said opening to remove a valve from said pocket.

8. A valve structure including a supporting member, a valve spindle movably supported by said member, a valve holder carried by said spindle and having on one side a hub and on the opposite side a pocket for a valve with openings from the back of the holder and on opposite sides of said hub into said pocket, and a tool having branches with a space therebetween to receive said hub and pins on said branches to enter said openings, said tool being adapted to be pressed between the back of said holder and the edge of said supporting member to force said pins into said recess to remove a packing therefrom.

GEORGE B. McCRACKEN.